United States Patent [19]

Wyman et al.

[11] 3,842,509
[45] Oct. 22, 1974

[54] STRAIN GAUGE AMBIGUITY SENSOR FOR SEGMENTED MIRROR ACTIVE OPTICAL SYSTEM

[75] Inventors: Charles L. Wyman, Huntsville, Ala.; Thomas L. Howe, Atlanta, Ga.

[73] Assignee: The United States of America as represented by the administration of the National Aeronautics and Space Administration, Washington, D.C.

[22] Filed: Feb. 1, 1973

[21] Appl. No.: 328,792

[52] U.S. Cl............ 33/180 R, 33/DIG. 13, 350/292
[51] Int. Cl....................... G01b 7/18, G01b 7/31
[58] Field of Search...........33/180 R, 180 AT, 84, 33/DIG. 13; 73/88.5 R, 88.5 SD; 350/292

[56] References Cited
UNITED STATES PATENTS

| 2,761,216 | 9/1956 | Gollub | 33/DIG. 13 |
| 3,160,001 | 12/1964 | Ames | 73/88.5 SD |
| 3,270,554 | 9/1966 | Pfann | 73/88.5 SD |

FOREIGN PATENTS OR APPLICATIONS

| 48,889 | 12/1964 | Poland | 33/180 R |
| 1,282,301 | 11/1968 | Germany | 33/DIG. 13 |

OTHER PUBLICATIONS

R. M. Scott, "Electrooptics in Space Operation and Research," IEEE Spectrum, Vol. 3, No. 1, Jan. 1966, pp. 85–88.

Primary Examiner—Louis R. Prince
Assistant Examiner—Richard R. Stearns
Attorney, Agent, or Firm—George J. Porter; L. D. Wofford, Jr.; John R. Manning

[57] ABSTRACT

A system to measure alignment between interfacing edges of a plurality of mirror segments positioned to form a segmented mirror surface, comprising strain gauge means having a bending beam with four piezoresistive elements coupled across the interfaces of the edges of adjacent mirror segments. The bending beam has a first position corresponding to alignment of the edges of adjacent mirror segments, and it is bendable from the first position in a direction and to a degree dependent upon the relative misalignment between the edges of adjacent mirror segments to correspondingly vary the resistance of the strain gauge means. A source of power and an amplifier are connected in circuit with the strain gauge means whereby the output of the amplifier varies according to the misalignment of the edges of adjacent mirror segments.

9 Claims, 5 Drawing Figures

PATENTED OCT 22 1974　　3,842,509

STRAIN GAUGE AMBIGUITY SENSOR FOR SEGMENTED MIRROR ACTIVE OPTICAL SYSTEM

ORIGIN OF THE INVENTION

The invention described herein was made by employees of the United States Government and may be manufactured and used by or for the Government for governmental purposes without the payment of any royalties thereon or therefor.

BACKGROUND OF THE INVENTION

1. Field of the Invention

The invention relates to a diffraction-limited telescope and has particular utility in the field of orbiting astronomical telescopes having a primary mirror of 1 meter or more in diameter. More specifically, the invention relates to a sensor system for use in edge alignment of a primary mirror comprising a plurality of segmented mirror sections.

2. Description of the Prior Art

The development and fabrication of large (larger than 1 meter diameter) telescopes having acceptable diffraction limited characteristics for orbital use is not a straightforward problem. Specifically, it appears to be next to impossible to construct the primary mirror of such telescopes as a single monolithic structure. There is evidence that single monolithic structures can be made up to about 1 meter diameter. Beyond 1 meter, however, other techniques must be used. In the context of this disclosure, the term acceptable characteristics is meant that there are no errors in the optical elements of more than $\lambda/50$, where $\lambda$ is the wavelength. As is well known to one skilled in the art, a typical value of wavelength of light used in the present invention would be about 6328 A. Diffraction limited means that all the optical elements are perfect, which is impossible. However, if all optical elements are figured to $\lambda/50$, the system will have 95 percent of the capability of a perfect diffraction limited system.

One such technique is to synthesize a large telescope primary mirror out of diffraction limited segments. These segments are then controlled in real time to form one large surface to an accuracy of $\lambda/50$ or better. To do this requires a technique to measure the relative positions of the mirror segments and control them with respect to one another. Several interferometric techniques can do this except for one drawback. That drawback is that the interferometers give out ambiguous information. The interferometers measure to a precision of $\lambda/50$ or better but give out ambiguous readings for every multiple integer wavelength. In other words, the interferometer cannot distinguish the difference between perfectly aligned segments and segments displaced by $n\lambda$ wavelengths, where $n$ is an integer equal to or greater than 1. A second sensor, known as an ambiguity sensor, is required to resolve at which wavelength increment the mirrors are located and to control the mirrors to less than one wavelength, where the interferometer sensor can take over.

The only known prior device available for ambiguity sensing is the use of a Kosters prism in a white light interferometer. However, this device has two serious disadvantages. First, it is a very complicated system using numerous optical elements, a mechanical chopper wheel and motor, electronic circuits, etc. Secondly, the output of the device is non-linear and greatly increases the complexity of the control system, and further places more requirements on the figure sensor whose signals are working in conjunction with the ambiguity sensor. Specifically, with this ambiguity sensor it is necessary to obtain a high number of data points from the figure sensor in order to achieve a stable control loop.

SUMMARY OF THE INVENTION

These and other disadvantages of the prior art are solved by the instant invention which relates to an ambiguity sensor device comprising a temperature compensated, semiconductor strain gauge. One type of strain gauge that may be used is a four arm bridge type bending beam which, for illustrative purposes, may be type SB-3-350-300-4, manufactured by Kulite Semiconductor Products, Inc. However, other configurations and models of semiconductor strain gauges are also acceptable.

The strain gauge is cantilevered on one end by bonding to a block of glass. The block of glass is in turn bonded to an active mirror segment, near its edge. The other end of the strain gauge is inserted into a V shape groove in a second glass block, which is bonded near the edge of an adjacent mirror segment. The V groove serves as a flexible pivot point for the strain gauge so that the inserted end will move up or down with relative motion between mirror segments, bending the strain gauge and causing a corresponding electrical output. The V pivot is only one way of providing a flexible pivot, and is disclosed for illustrative purposes.

The strain gauge may be supplied with either AC or DC voltage. If the gauge is bent, the bridge is unbalanced causing an output. The output of the bridge is fed to a differential operational amplifier. Each side of the bridge supplies an output with respect to ground. One side of the operational amplifier is provided with an adjustable feedback path so as to null the output of the amplifier by balancing the gain of the differential inputs. This technique will also allow electrical nulling of the output for residual strain that might exist in the mechanical setup when the mirrors are actually aligned. This provides greater versatility and greater ease of installation.

The advantages of the strain gauge ambiguity sensor according to the invention over prior art are:
1. great simplicity in the sensing and associated electronics and servo control loops; and
2. linearity of sensor output versus mirror displacement, over a wide range, on the order of ± 125 wavelengths or more, which results in greater simplicity in the control loops, and also eases the burden on the figure sensor, greatly simplifying that operation as well.

DETAILED DESCRIPTION OF THE INVENTION

Figure 1:
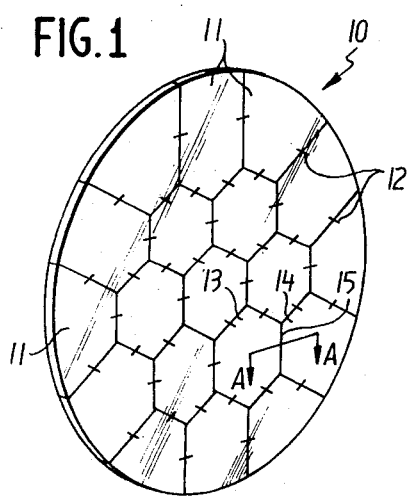
FIG. 1 shows a mirror surface comprising a plurality of segmented mirror segments coupled by strain gauge sensors.

FIG. 1 shows primary mirror 10 of an optical telescope as comprising a plurality of mirror segments 11 to form one large mirror surface, which may be diffraction limited to an accuracy of $\lambda/50$ or better. To provide such accuracy the relative positions of the mirror segments 11 must be accurately measured and controlled. To achieve this, edges of adjacent mirror segments 11 are coupled by individual strain gauge devices 12 according to the invention, as shown in greater detail in FIGS. 2 through 4.

Figure 2:
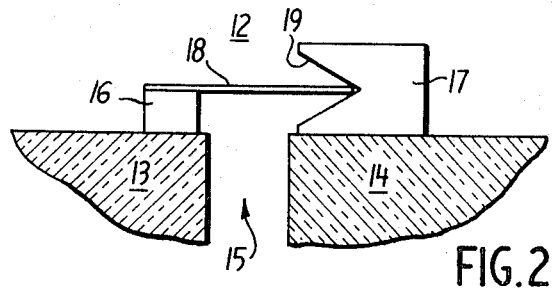
FIGS. 2, 3 and 4 are cross-section views taken along section lines A—A of FIG. 1, showing the strain gauge sensor coupling across the interface between the edges of adjacent mirror segments, with the strain gauges respectively being straight, bent upwardly, and bent downwardly.

FIG. 2 shows a cross-section view of mirror segments 13 and 14, showing the strain gauge coupled therebetween across interface 15. A first block 16 which may be glass is bonded to mirror segment 13 near its edge at interface 15. A second block 17 which may also be glass and which defines a V shaped groove 19 is bonded to mirror segment 14, near its edge at interface 15. A strain gauge sensor 18, which may comprise a bending beam with four piezoresistive elements mounted on it, is fixed at one end to block 16, and at its other end within the V 19 groove of block 17. In this manner, strain gauge sensor 18 will move or bend in accordance with the relative motion between adjacent mirror segments 13 and 14.

Figure 3:
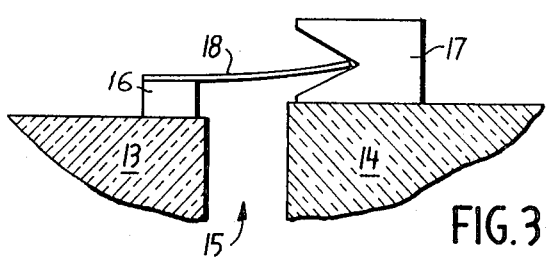
Figure 4:
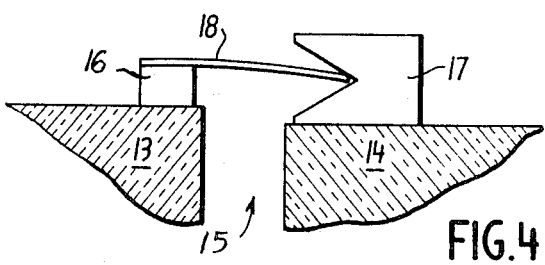

For example, FIG. 3 shows an upward movement of mirror segment 14 relative to mirror segment 13 resulting in an upward bending of strain gauge sensor 18, whereas FIG. 4 shows a downward movement of mirror segment 14 relative to mirror segment 13 resulting in a downward bending of strain gauge sensor 18. The direction and degree of bending will cause a corresponding change in the resistance of the strain gauge sensor 18, which will be electronically detected as explained hereafter.

Figure 5:
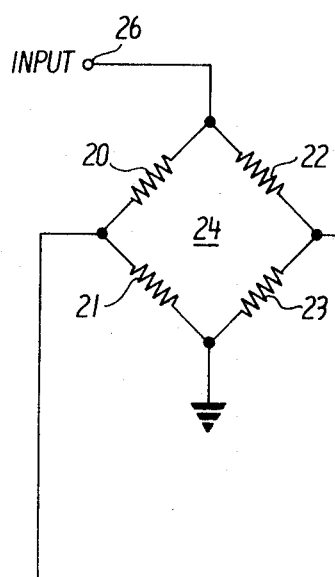
FIG. 5 is an electrical schematic diagram showing how a signal corresponding to misalignment of adjacent mirror segments may be derived.

FIG. 5 shows four piezoresistive elements or arms 20 through 23 arranged in an electrical bridge network 24. The output of the bridge network is connected to the inputs of differential operational amplifier 25. Resistors 20 through 23 have equal resistance values in their straight or unbent position corresponding to accurate alignment of adjacent mirror segments.

The strain gauge sensor 18 may comprise piezoresistive elements 20 through 23 atomically bonded to a silicon base using techniques of solid state diffusion. Elements 20 and 23 are oriented in the bending direction and their resistance will vary similarly depending upon the direction and degree of bending. Elements 21 and 22 are in the orthogonal direction to bending and hence do not change their resistive value. This provides a strain gauge sensor having (1) high gauge resistance and high output for small physical size, (2) good temperature coefficient of gauge factor, (3) increased electrical insulation resistance when cemented on metals, and (4) excellent transmittal of stress.

Thus when the strain gauge sensor 18 is bent, the bridge will be unbalanced causing an output which is fed to the differential amplifier 25. The input to the bridge network is connected between the input terminal 26 and ground. The output of the bridge network will depend upon the direction and degree of relative movement between adjacent mirror segments 13 and 14. The circuit of FIG. 5 is conventional and is therefore not explained in detail herein. However, potentiometer 27 provides an adjustable feedback path for the differentially connected operational amplifier to enable nulling of the output of the amplifier by balancing the gain of the differential inputs, and also enables electrical nulling of the amplifier output for any residual strain that might exist in the mechanical setup of FIG. 3, when adjacent mirror segments are actually aligned. This provides greater versatility and ease of adjustment.

We claim:

1. A system capable of measuring misalignment of the order of a few thousandths of an inch between interfacing edges of a plurality of mirror segments positioned to form a segmented mirror surface, comprising:

strain gauge means comprising a bending arm coupled across the interface of the edges of adjacent mirror segments, said bending arm having a first position corresponding to alignment of the edges of adjacent mirror segments, and being bendable from the first position in a direction and to a degree dependent upon the relative misalignment between the edges of adjacent mirror segments to correspondingly vary the resistance of the strain gauge means, said bending arm having a plurality of piezoresistive elements mounted on it, a source of power, an amplifier, the strain gauge means and the amplifier being connected in circuit with the source of power to vary the output of the amplifier according to the misalignment of the edges of adjacent mirror segments, said strain gauge means comprising a first block bonded to a first mirror segment, a second block defining a groove facing said first block bonded to an adjacent second mirror segment, a first end of said bending beam being bonded to the first block, and the second end thereof being bonded in pivotal fixed position in the groove of the second block.

2. A system as recited in claim 1 wherein said plurality of piezoresistive elements comprises four piezoresistive elements mounted on said bending beam and forming a temperature compensated bridge circuit.

3. A system as recited in claim 2 wherein the four piezoresistive elements arranged to form a bridge circuit are connected to a differential operational amplifier to produce an output signal therefrom indicative of the direction and degree of bending corresponding to the relative positions of the adjacent mirror segments.

4. A system as recited in claim 3 wherein the groove is V shaped.

5. A system as recited in claim 3 wherein said piezoresistive elements comprise piezoresistive material bonded to a semiconductor base by solid state diffusion.

6. A strain gauge device to measure misalignment between two surfaces comprising:

a first block bonded to the first surface, a second block bonded to the second surface, the second block defining a groove facing said first block, a bending beam having at least one resistive strain gauge element mounted thereon, having a first end bonded to the first block and a second end bonded in pivotal fixed position in the groove of the second block, whereby misalignment between the two surfaces causes a corresponding bending of said bending beam and a change in the resistance of at least one strain gauge element.

7. A system as recited in claim 6 wherein said at least one strain gauge element comprises four piezoresistive elements mounted on said bending beam and forming a temperature compensated bridge circuit.

8. A system as recited in claim 7 wherein the four piezoresistive elements arranged to form a bridge circuit are connected to a differential operational amplifier to produce an output signal therefrom indicative of the direction and degree of bending corresponding to the relative positions of the two surfaces.

9. A system as recited in claim 8 wherein the groove is V shaped.

* * * * *